United States Patent
Singh

(10) Patent No.: US 10,951,278 B2
(45) Date of Patent: Mar. 16, 2021

(54) INTERFERENCE MITIGATION TECHNIQUE FOR A MSS SYSTEM FROM AN INVERTED TERRESTRIAL FREQUENCY BWA REUSE

(71) Applicant: Telcom Ventures, LLC, Miami, FL (US)

(72) Inventor: Rajendra Singh, Indian Creek Village, FL (US)

(73) Assignee: TELCOM VENTURES, LLC, Miami, FL (US)

(*) Notice: Subject to any disclaimer, the term of this patent is extended or adjusted under 35 U.S.C. 154(b) by 179 days.

(21) Appl. No.: 16/253,663

(22) Filed: Jan. 22, 2019

(65) Prior Publication Data

US 2019/0245590 A1    Aug. 8, 2019

Related U.S. Application Data

(60) Provisional application No. 62/626,259, filed on Feb. 5, 2018.

(51) Int. Cl.
| | |
|---|---|
| *H04B 7/04* | (2017.01) |
| *H04B 7/0426* | (2017.01) |
| *H04W 52/24* | (2009.01) |
| *H01Q 3/26* | (2006.01) |
| *H04B 7/185* | (2006.01) |

(52) U.S. Cl.
CPC .......... *H04B 7/043* (2013.01); *H01Q 3/2611* (2013.01); *H04B 7/18513* (2013.01); *H04B 7/18595* (2013.01); *H04W 52/243* (2013.01)

(58) Field of Classification Search
CPC ...... H01Q 3/2611; H04W 16/14; H04B 7/043
See application file for complete search history.

(56) References Cited

U.S. PATENT DOCUMENTS

| | | | |
|---|---|---|---|
| 2002/0041575 | A1 | 4/2002 | Karabinis et al. |
| 2003/0054760 | A1 | 3/2003 | Karabinis |
| 2006/0050660 | A1* | 3/2006 | Wells ................. H04B 7/18582 370/316 |
| 2007/0021060 | A1 | 1/2007 | Karabinis et al. |
| 2007/0135051 | A1 | 6/2007 | Zheng et al. |
| 2011/0134889 | A1 | 6/2011 | Harvey et al. |
| 2013/0235807 | A1 | 9/2013 | Lee et al. |
| 2016/0345183 | A1 | 11/2016 | Hamalainen et al. |
| 2018/0103381 | A1* | 4/2018 | Ramamurthi .......... H04B 7/086 |

OTHER PUBLICATIONS

International Search Report and Written Opinion of the International Searching Authority, International Application No. PCT/US19/14502, dated Jun. 10, 2019, 13 pp.

* cited by examiner

*Primary Examiner* — Curtis B Odom
(74) *Attorney, Agent, or Firm* — Myers Bigel, P.A.

(57) ABSTRACT

Methods of mitigating interference to a Mobile Satellite Service (MSS) satellite from terrestrial Broadband Wireless Access (BWA) base stations are provided. A method includes nulling first transmissions in a first base station subsector associated with a first terrestrial BWA base station that is in a first geographical area, and nulling second transmissions in a second base station subsector associated with a second terrestrial BWA base station that is in a second geographical area different from the first geographical area.

13 Claims, 15 Drawing Sheets

INTERFERENCE MITIGATION TECHNIQUE FOR A MSS SYSTEM FROM AN INVERTED TERRESTRIAL FREQUENCY BWA REUSE

CROSS REFERENCE TO RELATED APPLICATION

The present application claims the benefit of U.S. Provisional Patent Application Ser. No. 62/626,259, filed Feb. 5, 2018, the disclosure of which is herein incorporated in its entirety by reference.

BACKGROUND

With the increased demand for Broadband Wireless Access (BWA) networks, there is a significant interest in sharing the same radio spectrum for BWA and Mobile Satellite Service (MSS). MSS operators may use L-band and/or S-band frequencies to connect to non-directional earth station antennas for mobile telecommunications and/or maritime and other transport-related services. Geosynchronous Earth Orbit (GEO), Medium Earth Orbit (MEO), and/or Low Earth Orbit (LEO) MSS satellites may serve a particular geographic area and thus may be a long distance from BWA base stations in other geographic areas. However, the BWA base stations in other geographic areas may send transmissions with sufficient power and direction to interfere with signals received at an MSS satellite. Interference from terrestrial base station BWA transmitters to the MSS satellite receivers is thus of concern.

SUMMARY

According to some embodiments of the present inventive concepts, methods of mitigating interference to a Mobile Satellite Service (MSS) satellite from terrestrial Broadband Wireless Access (BWA) base stations are provides. The methods may include nulling first transmissions in a first base station subsector associated with a first terrestrial BWA base station that is in a first geographical area, and nulling second transmissions in a second base station subsector associated with a second terrestrial BWA base station that is in a second geographical area different from the first geographical area.

In some embodiments, the first transmissions in the first base station sub sector are assigned to a first terrestrial frequency, and the first terrestrial frequency may be used as a first satellite uplink frequency. Nulling first transmissions in the first base station subsector may include refraining from assigning resource blocks that use the first terrestrial frequency in the first base station subsector to first BWA User Equipments (UEs) serviced by the first terrestrial BWA base station. The second transmissions in the second base station subsector may be assigned to a second terrestrial frequency. The second terrestrial frequency may be used as a second satellite uplink frequency. Nulling second transmissions in the second base station subsector may include refraining from assigning resource blocks that use the second terrestrial frequency in the second base station subsector to second BWA User Equipments (UEs) serviced by the second terrestrial BWA base station.

In some embodiments, nulling first transmissions in the first base station subsector may include reducing transmit power in the first base station subsector from the first terrestrial BWA base station to first BWA User Equipments (UEs) below a satellite interference threshold power. The first geographical area may include a first plurality of terrestrial BWA base stations including the first terrestrial BWA base station. Reducing transmit power in the first base station subsector may include reducing an aggregated transmit power in the first base station subsector of the first plurality of terrestrial BWA base stations below a satellite interference threshold power. The first base station subsector may include an intersection of a horizontal sector of a plurality of horizontal sectors and a vertical sector of a plurality of vertical sectors defined by an active antenna pattern associated with the first terrestrial BWA base station. The first base station subsector may be selected based on respective down tilt angles of ones of the plurality of vertical sectors associated with the first terrestrial BWA base station and based on respective directions with respect to the MSS satellite of ones of the plurality of horizontal sectors associated with the first terrestrial BWA base station.

In some embodiments, the method may further include monitoring a plurality of satellite frequencies for interference caused by one or more of the terrestrial BWA base stations at the MSS satellite, and identifying a satellite frequency of the plurality of satellite frequencies responsive to the interference caused by the terrestrial BWA base stations being below a threshold interference for use for MSS communication. The method may include refraining from assigning resource blocks that use the satellite frequency that was identified to BWA User Equipments (UEs) for terrestrial communication. A wireless electronic device may be configured to perform the method operation described herein.

According to some embodiments, a computer program product includes a non-transitory computer readable storage medium including computer readable program code therein that when executed by a processor causes the processor to perform the method operations described herein.

According to some embodiments, a method of mitigating interference to a Mobile Satellite Service (MSS) satellite from terrestrial Broadband Wireless Access (BWA) base stations is provided. The method includes monitoring a plurality of frequency bands for interference caused by the terrestrial BWA base stations at the MSS satellite, and identifying a frequency band of the plurality of frequency bands for use for MSS communication for which the interference caused by the terrestrial BWA base stations may be below a threshold interference. The method may further include communicating, to one or more of the terrestrial BWA base stations, the frequency band for avoidance of usage in terrestrial BWA communication. A MSS wireless electronic device may be configured to perform the method operations as described herein. In some embodiments, a computer program product may include a non-transitory computer readable storage medium including computer readable program code therein that when executed by a processor causes the processor to perform the operations of the method described herein.

According to some embodiments, a method of mitigating interference to a Mobile Satellite Service (MSS) satellite from terrestrial Broadband Wireless Access (BWA) base stations is provided. The method includes receiving, from a MSS controller, a frequency band for which the interference caused by the terrestrial BWA base stations at the MSS satellite may be below a threshold, and refraining from assigning resource blocks that use the frequency band to terrestrial BWA User Equipments (UEs) for terrestrial BWA communication between the terrestrial BWA base stations and the terrestrial BWA UEs. A BWA wireless electronic device may be configured to perform the operations of the method described herein. A computer program product may include a non-transitory computer readable storage medium including computer readable program code therein that when executed by a processor causes the processor to perform the operations of the method described herein.

According to some embodiments, a wireless electronic device includes a processor configured to perform operations including nulling first transmissions in a first base station subsector associated with a first terrestrial BWA base station that may be in a first geographical area, and nulling second transmissions in a second base station subsector associated with a second terrestrial BWA base station that may be in a second geographical area different from the first geographical area. The first transmissions in the first base station subsector may be assigned to a first terrestrial frequency. The first terrestrial frequency may be used as a first satellite uplink frequency. Nulling first transmissions in the first base station subsector may include refraining from assigning resource blocks that use the first terrestrial frequency in the first base station subsector to first BWA User Equipments (UEs) serviced by the first terrestrial BWA base station.

In some embodiments, the second transmissions in the second base station subsector may be assigned to a second terrestrial frequency. The second terrestrial frequency may be used as a second satellite uplink frequency. Nulling second transmissions in the second base station subsector may include refraining from assigning resource blocks that use the second terrestrial frequency in the second base station subsector to second BWA User Equipments (UEs) serviced by the second terrestrial BWA base station. Nulling first transmissions in the first base station subsector may include reducing transmit power in the first base station subsector from the first terrestrial BWA base station to first BWA User Equipments (UEs) below a satellite interference threshold power. The first geographical area may include a first plurality of terrestrial BWA base stations including the first terrestrial BWA base station. Reducing transmit power in the first base station subsector may include reducing an aggregated transmit power in the first base station subsector of the first plurality of terrestrial BWA base stations below a satellite interference threshold power.

In some embodiments, the first base station subsector may include an intersection of a horizontal sector of a plurality of horizontal sectors and a vertical sector of a plurality of vertical sectors defined by an active antenna pattern associated with the first terrestrial BWA base station. The first base station subsector may be selected based on respective down tilt angles of ones of the plurality of vertical sectors associated with the first terrestrial BWA base station and based on respective directions with respect to an MSS satellite of ones of the plurality of horizontal sectors associated with the first terrestrial BWA base station. The processor may be configured to perform operations further including monitoring a plurality of satellite frequencies for interference caused by one or more of the terrestrial BWA base stations at the MSS satellite, and identifying a satellite frequency of the plurality of satellite frequencies responsive to the interference caused by the terrestrial BWA base stations being below a threshold interference for use for MSS communication. The processor may be configured to perform operations further including refraining from assigning resource blocks that use the satellite frequency that was identified to BWA User Equipments (UEs) for terrestrial communication.

According to some embodiments, a MSS wireless electronic device for mitigating interference to a Mobile Satellite Service (MSS) satellite from terrestrial Broadband Wireless Access (BWA) base stations is provided. The MSS wireless electronic device includes a processor configured to perform operations including monitoring a plurality of frequency bands for interference caused by the terrestrial BWA base stations at the MSS satellite, and identifying a frequency band of the plurality of frequency bands for use for MSS communication for which the interference caused by the terrestrial BWA base stations may be below a threshold interference. The processor may be configured to perform operations further including communicating, to one or more of the terrestrial BWA base stations, the frequency band for avoidance of usage in terrestrial BWA communication.

According to some embodiments, a BWA wireless electronic device for mitigating interference to a Mobile Satellite Service (MSS) satellite from terrestrial Broadband Wireless Access (BWA) base stations is provided. The BWA wireless electronic device includes a processor configured to perform operations including receiving, from a MSS controller, a frequency band for which the interference caused by the terrestrial BWA base stations at the MSS satellite may be below a threshold, and refraining from assigning resource blocks that use the frequency band to the terrestrial BWA User Equipments (UEs) for terrestrial BWA communication.

According to some embodiments, a method of mitigating interference to a Mobile Satellite Service (MSS) satellite from a terrestrial Broadband Wireless Access (BWA) base station is provided. The method includes receiving, at the terrestrial BWA base station, a pilot signal on a satellite downlink frequency, and adjusting terrestrial BWA communication on a satellite uplink frequency that corresponds to the satellite downlink frequency, responsive to the pilot signal. Adjusting terrestrial BWA transmission on the satellite uplink frequency may include refraining from assigning resource blocks that use the satellite uplink frequency for the terrestrial BWA communication. Adjusting terrestrial BWA transmission on the satellite uplink frequency may include reducing, by the terrestrial BWA base station, a transmit signal strength for the terrestrial BWA communication that uses the satellite uplink frequency for the terrestrial BWA communication. Adjusting terrestrial BWA communication on the satellite uplink frequency that corresponds to the satellite downlink frequency may include determining a channel status of a satellite downlink channel on which the pilot signal was received, determining the satellite downlink frequency that may be paired with the satellite uplink frequency, responsive to the receiving the pilot signal, assuming that a satellite uplink channel associated with the satellite uplink frequency may be subjected to the channel status of the satellite downlink channel, and adjusting terrestrial BWA communication on the satellite uplink frequency based on the channel status of the satellite downlink channel. A BWA wireless electronic device may be configured to perform the operations according to the method described herein. A computer program product may include a non-transitory computer readable storage medium including computer readable program code therein that when executed by a processor causes the processor to perform the operations of the method described herein.

According to some embodiments, a method of mitigating interference to a Mobile Satellite Service (MSS) satellite from a terrestrial Broadband Wireless Access (BWA) base station is provided. The method includes transmitting a pilot signal from the MSS satellite to the terrestrial BWA base station on a satellite downlink frequency, and receiving reduced interference from the terrestrial BWA base station on a satellite uplink frequency that corresponds to the satellite downlink frequency, responsive to the pilot signal.

The reduced interference from the terrestrial BWA base station may correspond to the terrestrial BWA base station refraining from assigning resource blocks that use the satellite uplink frequency. The reduced interference from the terrestrial BWA base station may correspond to reduced transmit signal strength of terrestrial BWA communication that uses the satellite uplink frequency for the terrestrial BWA communication. The pilot signal on the satellite downlink frequency may be subjected to a satellite downlink channel status that corresponds to a satellite uplink channel status. A MSS wireless electronic device may be configured to perform the operations of the method described herein. A computer program product may including a non-transitory computer readable storage medium including computer readable program code therein that when executed by a processor causes the processor to perform operations of the method described herein.

According to some embodiments, a wireless electronic device for mitigating interference to a Mobile Satellite Service (MSS) satellite from a terrestrial Broadband Wireless Access (BWA) base station is provided. The wireless electronic device includes a processor configured to perform operations including receiving, at the terrestrial BWA base station, a pilot signal on a satellite downlink frequency, and adjusting terrestrial BWA communication on a satellite uplink frequency that corresponds to the satellite downlink frequency, responsive to the pilot signal. Adjusting terrestrial BWA transmission on the satellite uplink frequency may include refraining from assigning resource blocks that use the satellite uplink frequency for the terrestrial BWA communication. Adjusting terrestrial BWA transmission on the satellite uplink frequency may include reducing, by the terrestrial BWA base station, a transmit signal strength for the terrestrial BWA communication that uses the satellite uplink frequency for the terrestrial BWA communication. Adjusting terrestrial BWA communication on the satellite uplink frequency that corresponds to the satellite downlink frequency may include determining a channel status of a satellite downlink channel on which the pilot signal was received, determining the satellite downlink frequency that may be paired with the satellite uplink frequency, responsive to the receiving the pilot signal, assuming that a satellite uplink channel associated with the satellite uplink frequency may be subjected to the channel status of the satellite downlink channel, and adjusting terrestrial BWA communication on the satellite uplink frequency based on the channel status of the satellite downlink channel.

According to some embodiments, a wireless electronic device for mitigating interference to a Mobile Satellite Service (MSS) satellite from a terrestrial Broadband Wireless Access (BWA) base station is provided. The wireless electronic device includes a processor configured to perform operations including transmitting a pilot signal from the MSS satellite to the terrestrial BWA base station on a satellite downlink frequency, and receiving reduced interference from the terrestrial BWA base station on a satellite uplink frequency that corresponds to the satellite downlink frequency, responsive to the pilot signal. The reduced interference from the terrestrial BWA base station may correspond to the terrestrial BWA base station refraining from assigning resource blocks that use the satellite uplink frequency. The reduced interference from the terrestrial BWA base station may correspond to reduced transmit signal strength of terrestrial BWA communication that uses the satellite uplink frequency for the terrestrial BWA communication. The pilot signal on the satellite downlink frequency may be subjected to a satellite downlink channel status that corresponds to a satellite uplink channel status.

DETAILED DESCRIPTION

Figure 1:
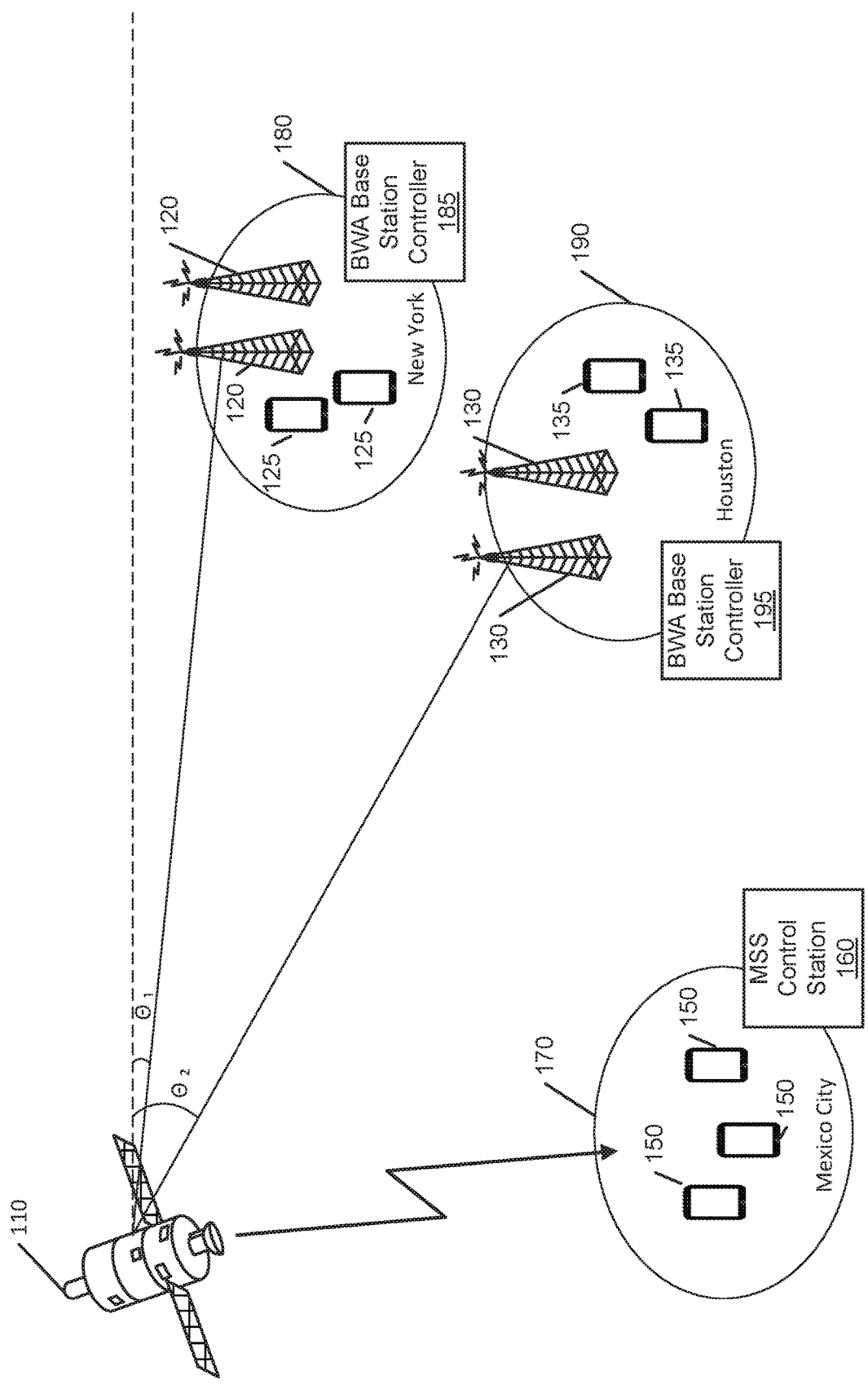
FIG. 1 is a diagram illustrating a geographical area that is served by Mobile Satellite Service (MSS) satellites and geographical areas served by Broadband Wireless Access (BWA) networks, according to some embodiments of the present inventive concepts.

Example embodiments of the present inventive concepts now will be described with reference to the accompanying drawings. The present inventive concepts may, however, be embodied in a variety of different forms and should not be construed as limited to the embodiments set forth herein. Rather, these embodiments are provided so that this disclosure will be thorough and complete, and will fully convey the scope of the present inventive concepts to those skilled in the art. In the drawings, like designations refer to like elements.

Satellite radio spectrum may be shared with terrestrial Broadband Wireless Access (BWA) radio spectrum. Typically, in these cases of using common radio spectrum in satellites and BWA systems, the spectrum may be used in a symmetrical fashion. In other words, spectrum used for Mobile Satellite Service (MSS) uplink (earth to space) and downlink (space to earth) may be paired in a similar manner as for ground based wireless systems for the downlink (base station (BS) to user equipment (UE)) and uplink (UE to BS). Terrestrial BWA uplink/downlink spectrum allocation may match with the spectrum allocation of MSS uplink/downlink. In the case of Advanced Wireless Services 40 MHz Spectrum (AWS4) in the U.S.A., this arrangement may be inverted for the earth to space uplink for the MSS. In the case of AWS4, spectrum assignment for the BWA is made for the downlink by including the spectrum which is used for the MSS uplink. Since a BWA system may have tens of thousands of base stations, the composite interference from the base stations' transmissions into the MSS uplink can be significant unless techniques are used to mitigate such interference.

Use of geographically clustered BWA nulling with a feedback loop to mitigate interference to the MSS uplink will now be discussed. FIG. 1 illustrates a geographical area that is served by Mobile Satellite Service (MSS) satellites and geographical areas served by Broadband Wireless Access (BWA) networks. Referring now to FIG. 1, a MSS satellite 110 may be communicating with MSS user equipments (UEs) 150 in a geographical area 170 such as Mexico City. A MSS user equipment 150 may be one of various types of wireless electronic user devices, including mobile/cell phones, as well as wireless user devices without phone capabilities. For example, the MSS user equipment 150 may be a smartphone, a laptop computer, a tablet computer, or any other portable, wireless electronic user device with communications capability. The MSS user equipment 150 may be located inside a geographical area 170 serviced by satellite 110.

Still referring to FIG. 1, in a typical BWA system, there may be a large number of base stations in a given area. For example, a large, densely populated geographical area 180 such as New York City may have several thousand base stations 120 serving BWA user equipments 125. Another large geographical area 190 such as Houston may have several thousand base stations 130 serving BWA user equipments 135. The BWA user equipments 125 and/or 135 may include various types of wireless electronic user devices, including mobile/cell phones, as well as wireless user devices without phone capabilities. For example, a BWA user equipment 125 and/or 135 may be a smartphone, a laptop computer, a tablet computer, or any other portable, wireless electronic device with communications capability. The BWA user equipments 125 and/or 135 may be located inside a geographical area serviced by a base station 120 or 130, respectively. In many cases, the amount of spectrum allocated to geographical area 180 and/or 190 may be large. For example, AWS4, having 40 MHz of spectrum assigned along with an adjacent spectrum (e.g. H block in the 1915-1920 MHz and/or 1995-2000 MHz bands) will result in a total assignment of 45 MHz to geographical areas 180 and/or 190. In these geographical areas 180 and/or 190, vertical frequency reuse using Active Antenna Systems (AAS) may greatly enhance the spectral efficiency (SE) and/or improve the edge of cell performance, as will now be discussed.

Figure 2A:
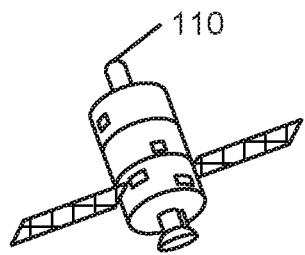
FIGS. 2A and 2B are diagrams illustrating horizontal and vertical sectors and subsectors served by Broadband Wireless Access (BWA) networks, according to some embodiments of the present inventive concepts.
Figure 2A:
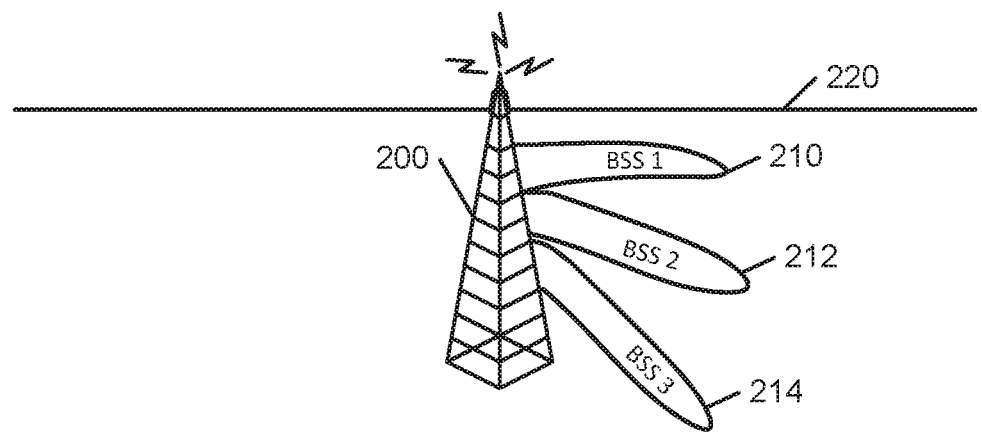
Figure 2B:
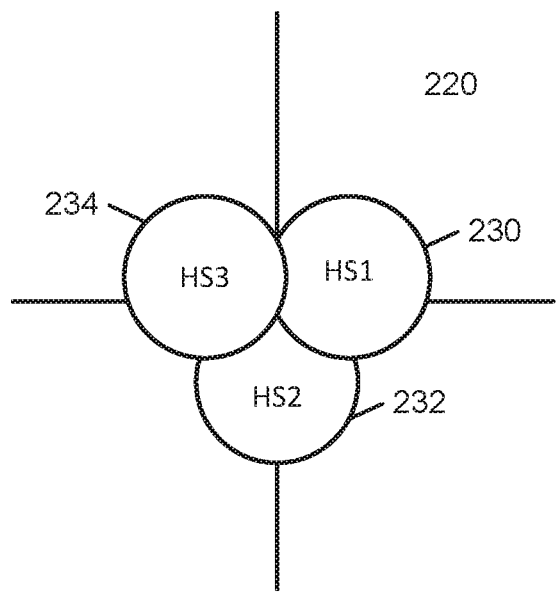

Using AAS and/or Multiple Input Multiple Output (MIMO) systems, a base station's coverage area may be split into horizontal and/or vertical sectors to provide different subsectors for improving spectral efficiency and edge of cell performance. FIGS. 2A and 2B illustrate horizontal and vertical sectors and subsectors served by Broadband Wireless Access (BWA) networks. Referring now to FIG. 2A, a BWA base station 200 may be divided into several vertical sectors, such as, for example, three vertical sectors BSS1/BSS2/BSS3. Referring to FIG. 2B, which is a plan view of the BWA coverage area of the base station 200 of FIG. 2A, the coverage area may be divided into cells or horizontal sectors HS1, HS2, and/or HS3. A typical base station may have three horizontal sectors. The various combinations of horizontal sectors and vertical sectors may result in a total of nine sub sectors (or sub cells) BSS1, BSS2, and/or BSS3, in the example of FIGS. 2A and 2B. In this example, the MSS system may use the nulls in the vertical antenna pattern to reuse the spectrum in the uplink direction towards the MSS satellite 110. Specifically, a null at vertical sector BSS3 may be used by the MSS uplink, such that interference from the BWA base station 200 is mitigated.

In case of a Geosynchronous Earth Orbit (GEO) MSS, the Angle of Arrival (AOA) at a victim MSS satellite may be generally fixed from a geographically clustered area. Thus a GEO satellite may use the nulls in the antenna pattern instead of using spectral side lobes for uplink transmissions since spectral side lobes may have significantly higher gain than the nulls. In some embodiments, base station subsectors which are more down tilted than other subsectors may be selected to mitigate interference. In the case of Medium Earth Orbit (MEO) or Low Earth Orbit (LEO) MSS systems, the AOA may not be fixed due to the lower location above the earth's surface, i.e. closer to terrestrial BWA base stations 120/130/200. In other words, the AOA may change as the MSS satellite moves across the sky. Referring once again to FIG. 1, terrestrial signals from BWA base stations 120 in the New York geographic area 180 may have an angle of arrival $\theta_1$ at satellite 110 that is different from the angle of arrival $\theta_2$ from BWA base stations 130 in the Houston geographic area 190. Thus, interference from BWA base stations 120 at satellite 110 may be treated differently from the interference from BWA base stations 130.

In the case of a MEO or a LEO MSS system, a feedback loop may be used to determine which portions of the spectrum band are usable for the MSS system. These portions of the spectrum band may be in the nulls of clustered base stations 120 and/or 130 of FIG. 1. Moreover, the down tilt in these clustered base stations 120 and/or 130 may be adjusted to mitigate interference in a portion of the sky where BWA has a higher potential for interference. This adjustment of the down tilt may not harm the performance of the BWA system since AAS and/or MIMO techniques improve the spectral efficiency of the BWA system. A LEO or a MEO MSS system may make periodic spectrum measurements to determine which parts of the overall spectrum band are available for reuse. In some cases, aggregated interference to the MSS satellite 110 from the BWA system can be assumed to be a time invariant system, such that measurements may be made in real-time or a database of such measurement can be maintained to assign frequency allocation to a given MEO or LEO satellite in a group of MSS satellites in such a system. These measurements may be stored in the satellite 110 and/or in a ground station MSS Control Station 160 of FIG. 1. The MSS Control Station 160 may assist in the frequency assignment.

Use of geographically clustered nulling with a feedback loop and reverse frequency assignment between the MSS and the BWA will now be discussed. In modern BWA systems, a base station controller/scheduler, such as base station controller 185 or 195 of FIG. 1, may determine which resource blocks (i.e. time/frequency) should be assigned to a given BWA UE 125/135 to maximize user experience and overall base station throughput. A base station controller 185/195 may assign resource blocks to base station subsectors which are likely to cause reduced interference to the MSS system. For example, a base station controller 185/195 associated with BWA base station 200 may assign MSS uplink shared spectrum to the most down tilted base station subsector (e.g. BSS3) among a plurality of BWA base station subsectors BSS1, BSS2, and/or BSS3. In the case where each base station subsector has a different cell ID, each base station subsector may be treated as a different cell site. A given base station subsector may use lower power to mitigate interference to the MSS system. This may not significantly impact the BWA spectral efficiency. The selected subsectors may be for communication with BWA UEs which are near the BWA base station.

Use of the carrier sense and feedback techniques on the MSS down link (space to earth) will now be discussed in detail. In an inverted use of BWA spectrum, dominant interference may be received by the MSS system uplink (earth to space). Interference caused by BWA base station transmission may be monitored or measured by the MSS system on the MSS uplink. This interference caused by BWA base station transmissions may not be uniform across the entire radio spectrum used by the MSS system uplink.

There may be portions of the radio spectrum which are still usable by the MSS system even though there is interference from BWA base stations. More usable radio spectrum may be identified if the carrier sense monitoring is used in conjunction with clustered nulling and reverse frequency assignment. Portions of the radio spectrum and/or resource blocks which are usable by MSS uplinks may be assigned to a BWA UE 125/135 such that the BWA UE 125/135 may transmit on the assigned radio spectrum and/or resource blocks. Information regarding usable spectrum may be updated frequently for each satellite 110 and/or satellite spot beam.

Figure 3:
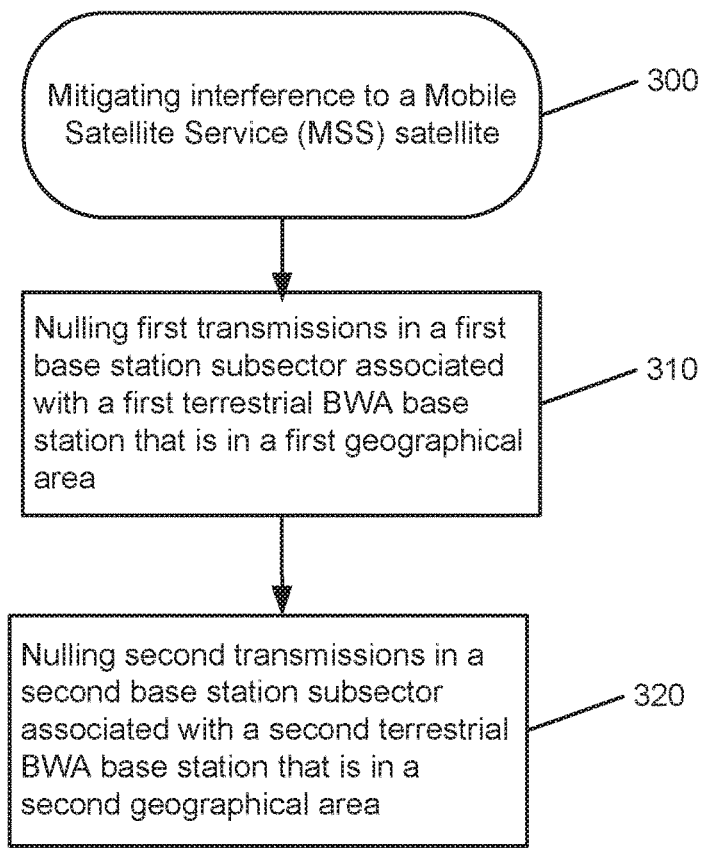
FIGS. 3 to 12 are flowcharts illustrating operations for reducing interference to a MSS satellite, according to some embodiments of the present inventive concepts.

FIGS. 3 to 12 are flowcharts illustrating operations for reducing interference to a MSS satellite. Referring now to FIG. 3, it may be desired to mitigate interference to the MSS satellite 110 of FIG. 1 caused by BWA base stations 120 and/or 130 using the same satellite frequencies as the MSS satellite link, at block 300. Densely populated geographic areas may have clusters of BWA base stations 120/130. The BWA base stations 120/130 in different geographic areas may cause interference at different interference power levels and/or at different angles to the satellite uplink, and thus geographically distinct clusters of BWA base stations 120/130 may be handled differently in terms of reducing interference to the MSS system. First transmissions in a first base station subsector may be nulled for a first terrestrial BWA base station 120 that is in a first geographical area 180, at block 310. Non-limiting examples of nulling may include operations such as not transmitting in the subsector using the shared frequencies of the satellite 110, reducing power for transmitting on the BWA downlink to BWA UEs 125, and/or not allocating resource blocks that are in the subsector that include the shared frequencies. Second transmissions in a second base station subsector may be nulled at a second terrestrial BWA base station 130 that is in a second geographical area 190 different from the first geographical area 180, at block 320. In other words, the BWA base stations 120 in the first geographical area 180 are handled differently than those of BWA base stations 130 in the second geographical area 190, such that different nulling operations are performed on different geographical clusters of BWA base stations 120/130.

Figure 4:
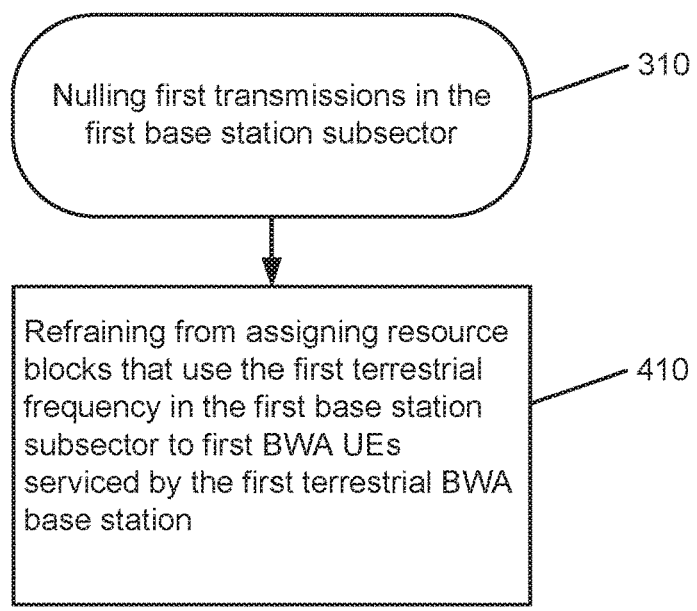
Figure 5:
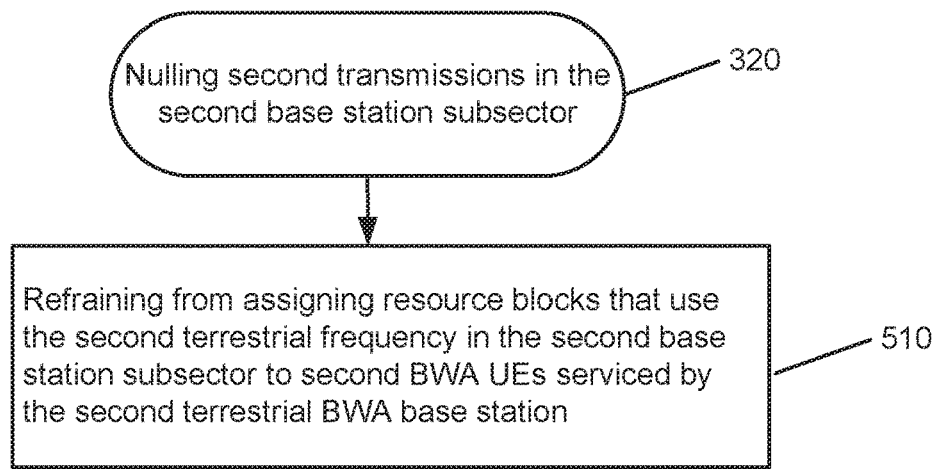

The first transmissions in the first base station subsector may be assigned to a first terrestrial frequency, and the first terrestrial frequency may used as a first satellite uplink frequency. Referring now to FIG. 4, nulling first transmissions in the first base station sector, at block 310, may include refraining from assigning resource blocks that use the first terrestrial frequency in the first base station subsector to first BWA UEs 125 serviced by the first terrestrial BWA base station 120, at block 410. The second transmissions in the second base station subsector may be assigned to a second terrestrial frequency, and the second terrestrial frequency may be used as a second satellite uplink frequency. Referring now to FIG. 5, nulling second transmissions in the second base station sector, at block 320, may include refraining from assigning resource blocks that use the second terrestrial frequency in the second base station subsector to second BWA UEs 135 serviced by the second terrestrial BWA base station 130, at block 510. Refraining from assigning resource blocks may include not assigning the specific resource block that use a frequency, but having other resource blocks available for communication through assignment or other allocation.

In some embodiments, the first base station subsector may be an intersection of a horizontal sector of a plurality of horizontal sectors and a vertical sector of a plurality of vertical sectors defined by an active antenna pattern associated with the first terrestrial BWA base station 120. The first base station subsector may be selected based on respective down tilt angles of ones of the plurality of vertical sectors associated with the first terrestrial BWA base station 120 and/or based on respective directions with respect to the MSS satellite 110 of ones of the plurality of horizontal sectors associated with the first terrestrial BWA base station 120.

Figure 6:
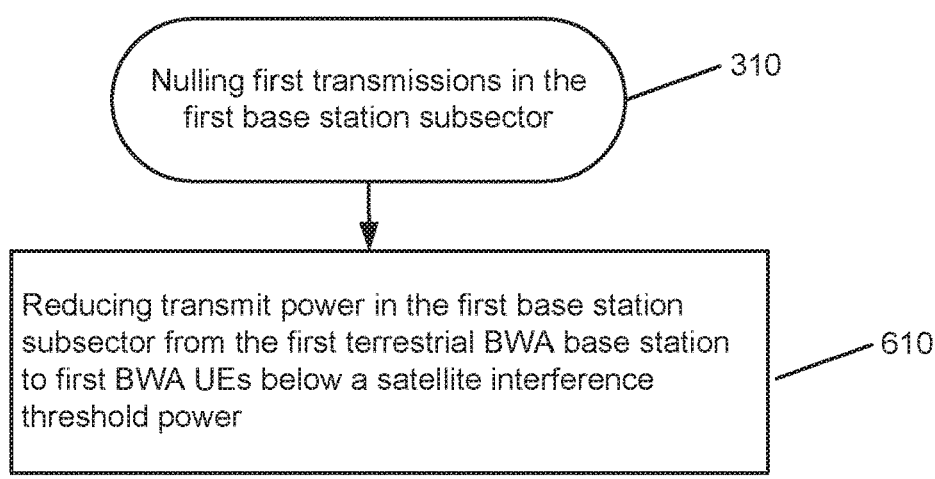
Figure 7:
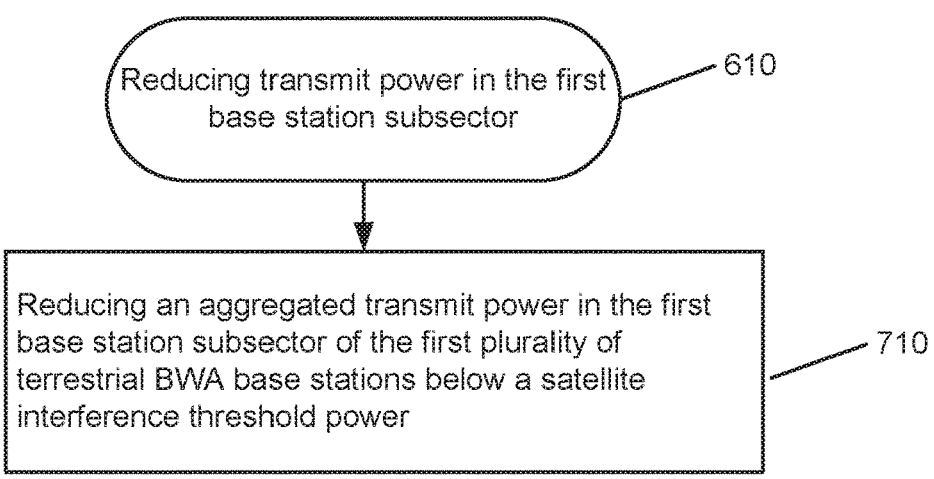

Referring now to FIG. 6, nulling first transmissions in the first base station sector, at block 310, may include reducing transmit power in the first base station sub sector from the first terrestrial BWA base station 120 to first BWA UEs 125 below a satellite interference threshold power, at block 610. In some embodiments, the first geographical area 180 may include a first plurality of terrestrial BWA base stations 120 including the first terrestrial BWA base station 120. A group of BWA base stations in a cluster such as in a geographic area may transmit signals to BWA UEs using one or more frequencies shared with the MSS system's satellite uplink. The aggregated transmit power of the communications between the BWA base stations and their respective UEs may collectively interfere with the satellite uplink communication between MSS UEs and their respective satellite 110. Thus, the aggregated transmit power may need to be reduced below a threshold interference power to reduce interference with the satellite uplink signals. Referring now to FIG. 7, reducing transmit power in the first base station subsector, at block 610, may include reducing an aggregated transmit power in the first base station subsector of the first plurality of terrestrial BWA base stations 120 below a satellite interference threshold power, at block 710.

Figure 8:
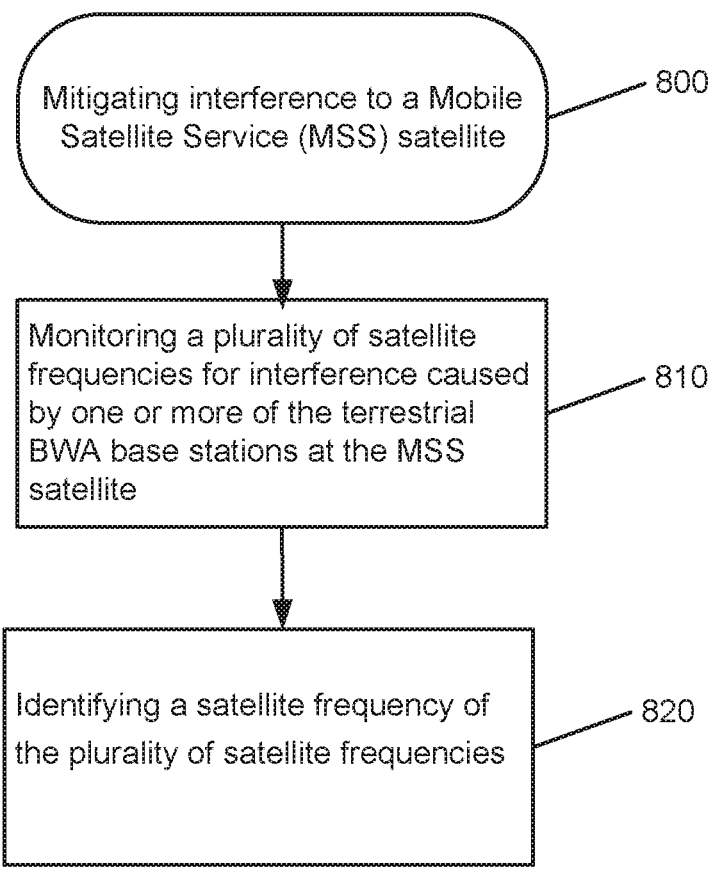

Referring now to FIG. 8, nulling first transmissions in the first base station sector, at block 800, may include monitoring a plurality of satellite frequencies for interference caused by one or more of the terrestrial BWA base stations 120/130 at the MSS satellite 110, at block 810. A satellite frequency of the plurality of satellite frequencies may be identified, responsive to the interference caused by the terrestrial BWA base stations 120/130 being below a threshold interference for use for MSS communication, at block 820.

Figure 9:
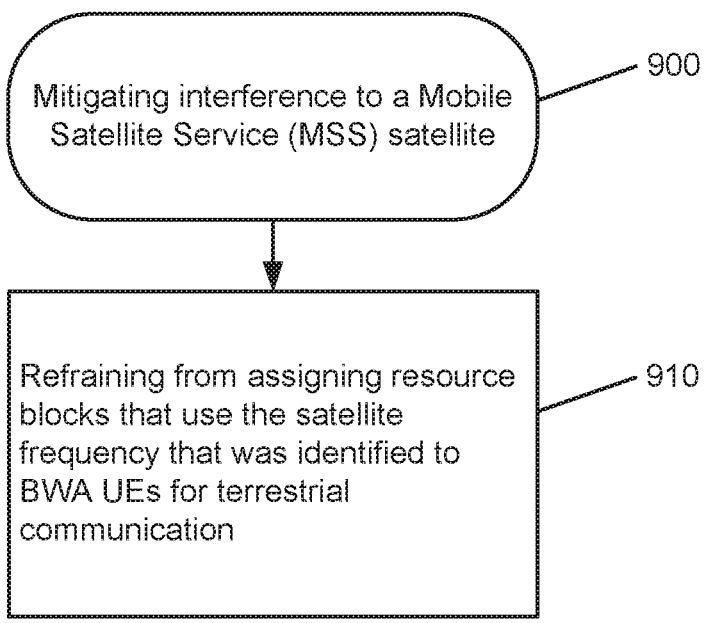

Referring now to FIG. 9, in some embodiments, the interference to a MSS satellite 110 may be mitigated, at block 900. Mitigating interference may include refraining from assigning resource blocks that use the satellite frequency that was identified to BWA UEs 125/135 for terrestrial communication, at block 910. Some of the operations of FIGS. 3 to 9 may be performed by MSS system elements such as the MSS control station 160, a MSS satellite 110, MSS UEs 150, and/or by a combination thereof. In some embodiments, some of the operations of FIGS. 3 to 9 may be performed by BWA system elements such as BWA base station controller 185/195, BWA UEs 125/135, BWA base stations 120/130, and/or a combination thereof.

Figure 10:
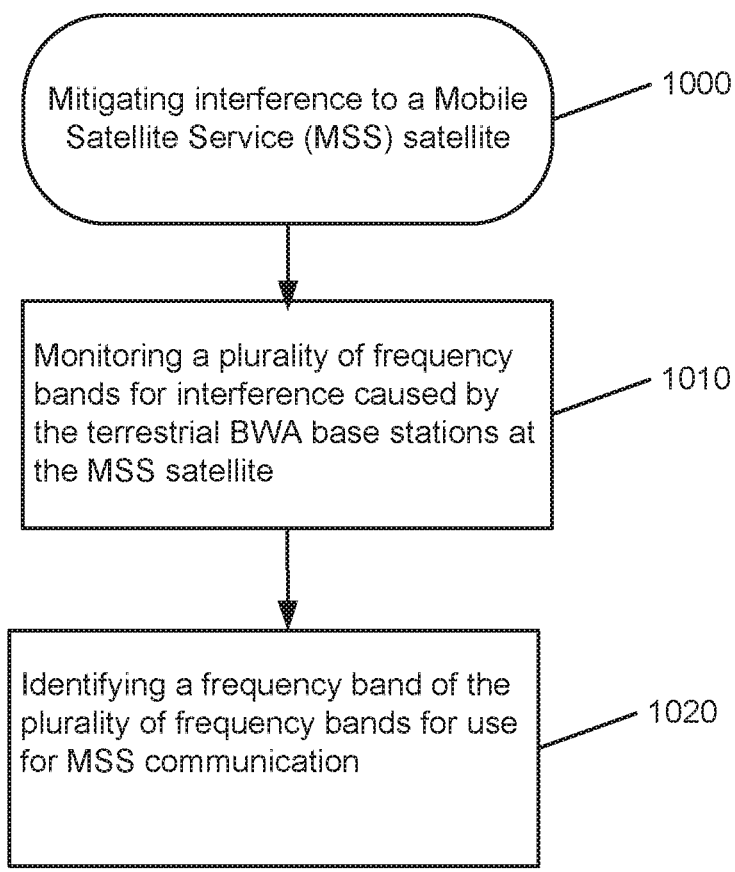
Figure 11:
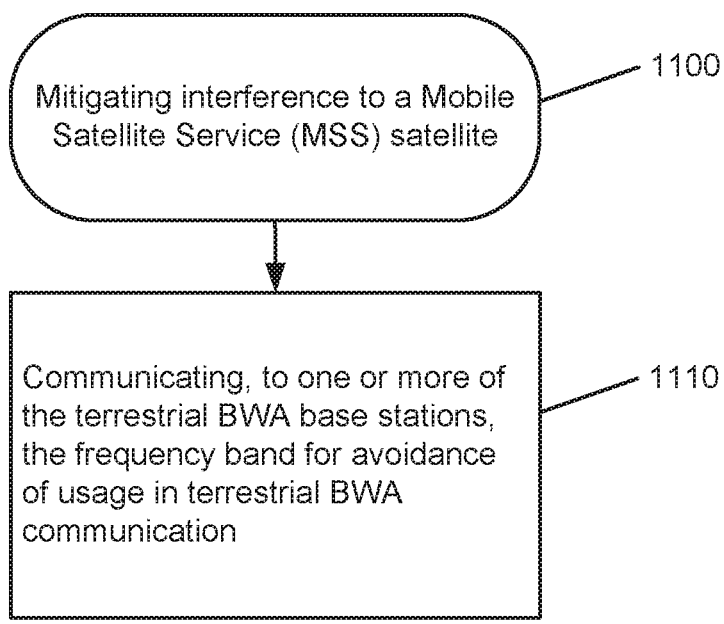

In some embodiments, the MSS system may perform operations to mitigate interference to the MSS satellite 110. Referring now to FIG. 10, interference to a MSS satellite may be mitigated at block 1000. Operations to aid in mitigation of interference from the BWA network may be performed by a terrestrial MSS controller 160 or by the MSS satellite 110, or by a combination thereof. A plurality of frequency bands may be monitored at the MSS satellite 110 for interference caused by the terrestrial BWA base stations 120/130, at block 1010. A frequency band that suffers for less interference from the BWA network may be identified for use for MSS communication, 1020. For example, the identified frequency band may have interference from the BWA base stations 120/130 below a threshold interference level. Referring now to FIG. 11, mitigating of interference to a MSS satellite 110, at block 1100, may include coordination between the MSS system and BWA system. The MSS controller 160 or MSS satellite 110 may communicate, to one or more of the terrestrial BWA base stations 120/130, the frequency band for avoidance of usage in terrestrial BWA communication, at block 1110.

Figure 12:
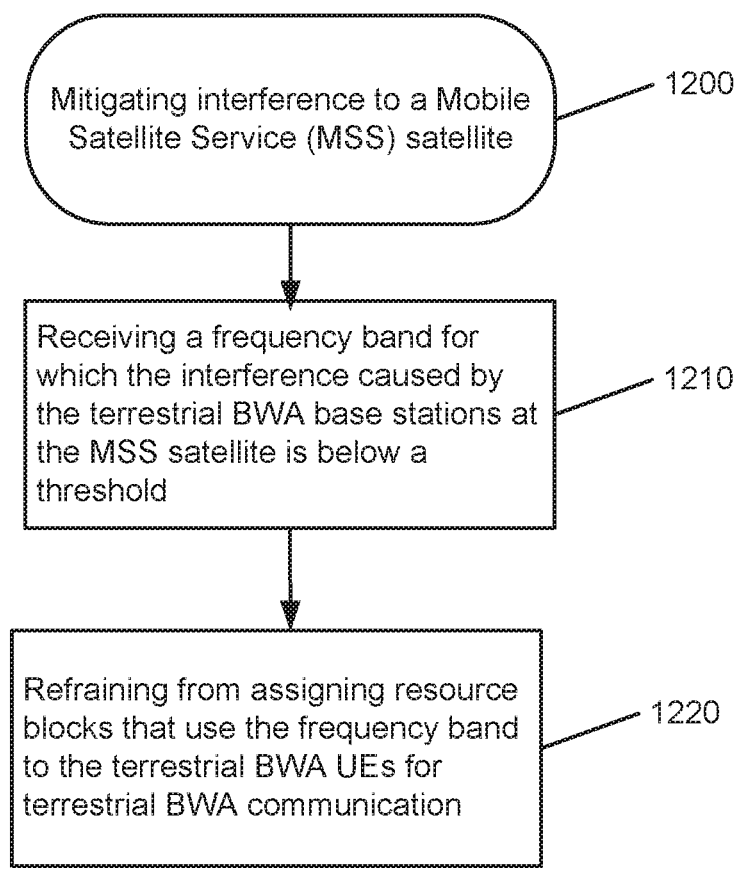

Referring now to FIG. 12, the BWA base stations 120/130 may be actively involved in mitigating interference to the MSS satellite, at block 1200. The BWA controller 185/195 and/or BWA base station 120/130 may receive, from a MSS controller 160, a frequency band for which the interference caused by the terrestrial BWA base stations 120/130 at the MSS satellite 110 is below a threshold, at block 1210. The BWA base station 120/130 may responsively refrain from assigning resource blocks that use the frequency band to the terrestrial BWA UEs 125/135 for terrestrial BWA communication, at block 1220.

Figure 13:
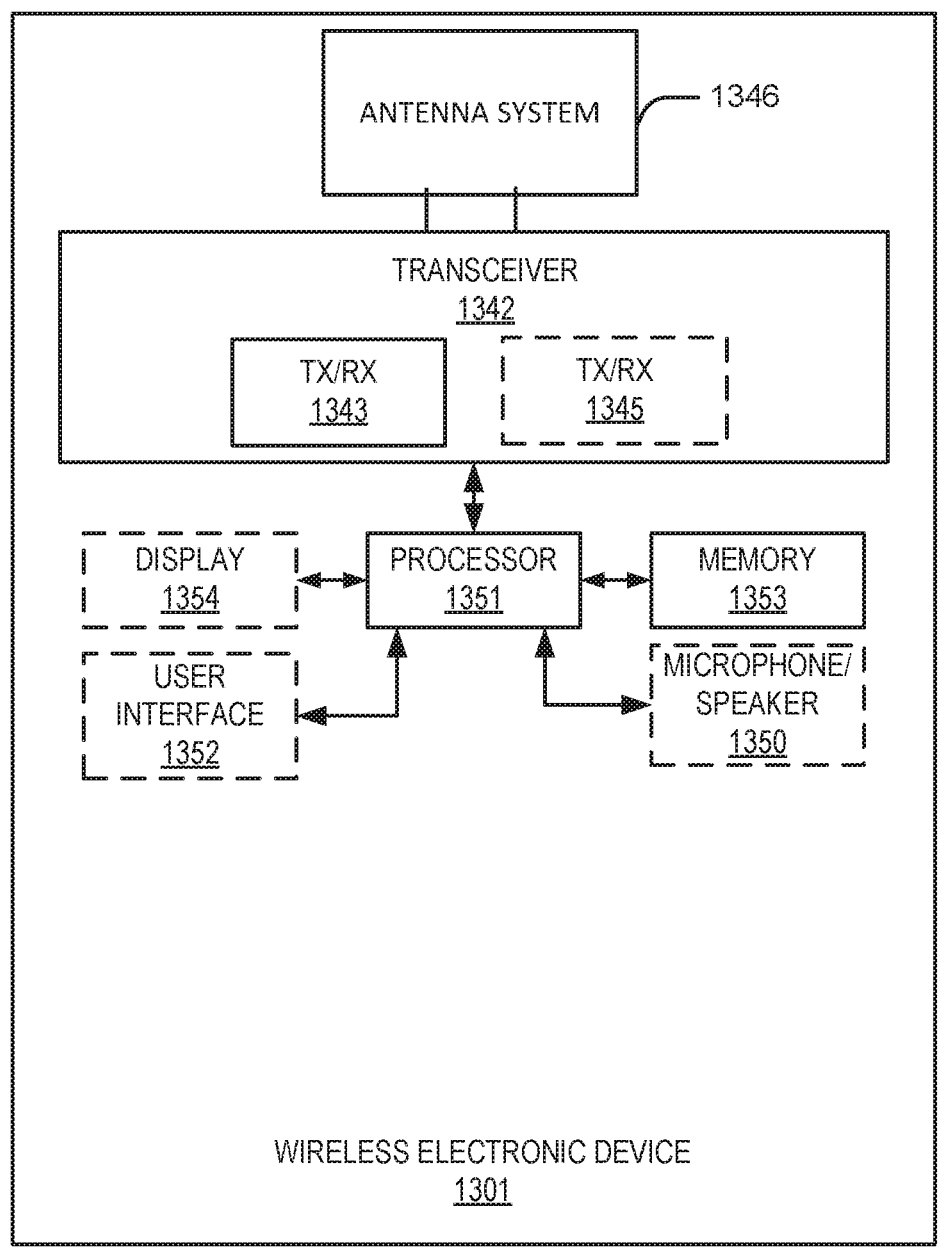
FIGS. 13 to 15 are block diagrams of various wireless electronic devices, according to some embodiments of the present inventive concepts.
Figure 14:
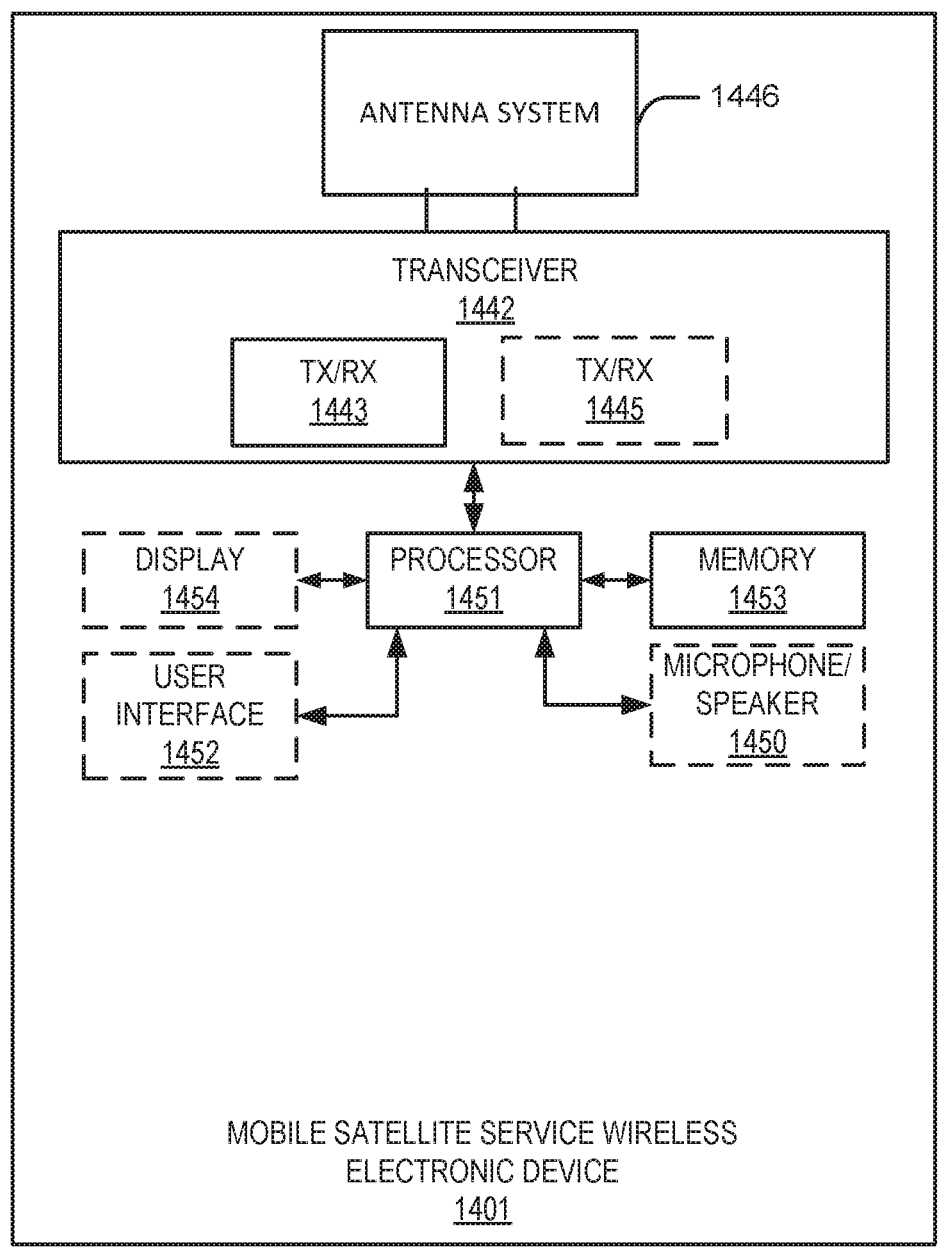
Figure 15:
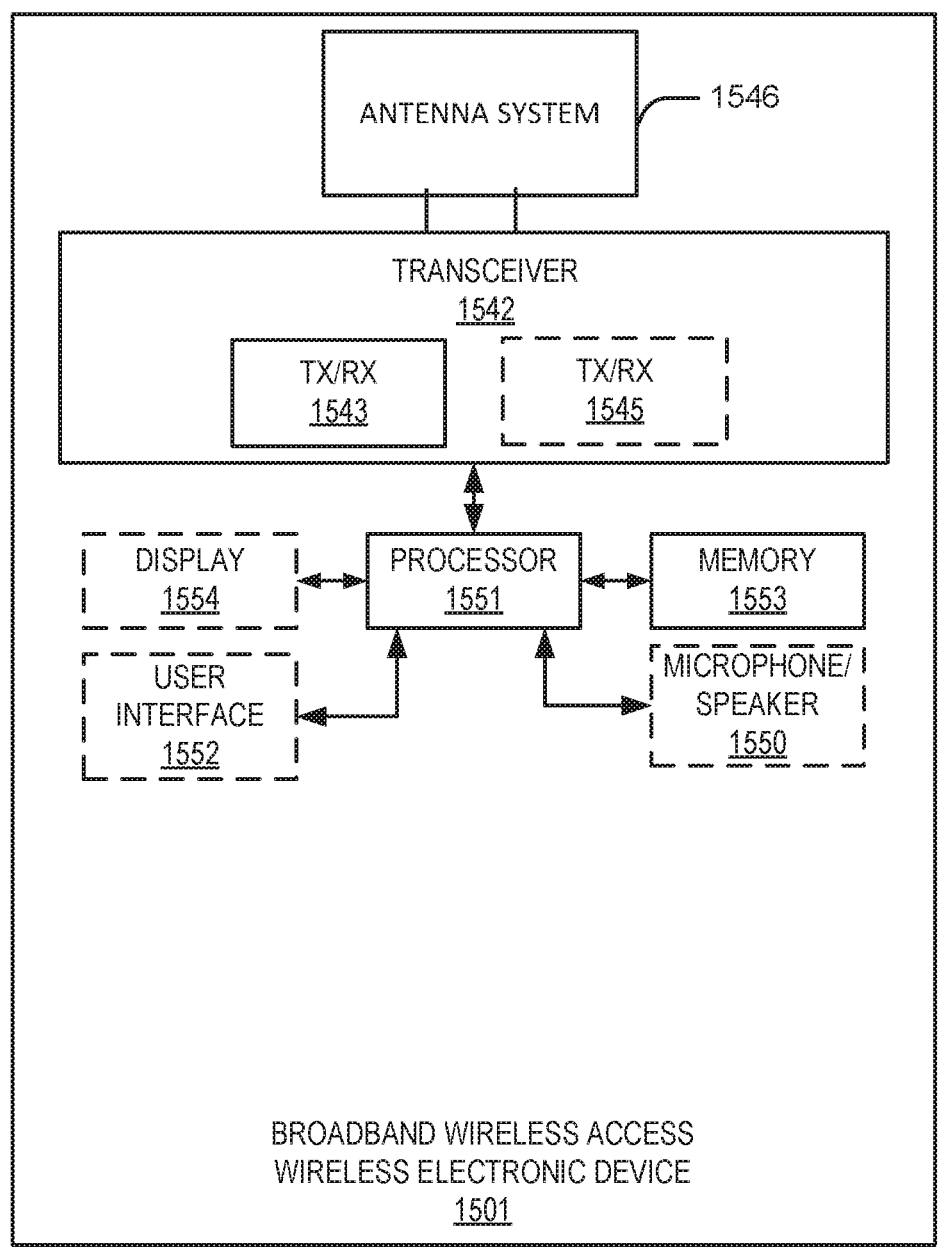

FIGS. 13, 14, and 15 are block diagrams of various electronic devices that may be used in a MSS system, a BWA system, or in both systems. Referring to FIG. 13, a block diagram is provided of a wireless electronic device which may correspond to one more of various BWA network elements such as base station 130, base station controller 185/195, UEs 150, and/or monitor station 160 of FIG. 1, according to some embodiments. Referring to FIG. 14, a block diagram is provided of a Mobile Satellite Service wireless electronic device, which may correspond to one more of various MSS network elements such as satellite 110, MSS control station 160, and/or MSS UEs 150 of FIG. 1, according to some embodiments. Referring to FIG. 15, a block diagram is provided of a Broadband Wireless Access wireless electronic device which may correspond to one or more of various terrestrial BWA network elements such as BWA base station 120/130, base station controller 185/195, and/or BWA UEs 125/135 of FIG. 1, according to some embodiments.

As illustrated in FIG. 13, a wireless electronic device 1301 may include an antenna system 1346, a transceiver 1342, a processor (e.g., processor circuit) 1351, and a memory 1353. Moreover, the wireless electronic device 1301 may optionally include a display 1354, a user interface 1352, and/or a microphone/speaker 1350. The MSS wireless electronic device 1401 of FIG. 14 and the BWA wireless electronic device 1501 of FIG. 15 may have components that operate similarly to those of wireless electronic device 1301 of FIG. 13 and thus details will not be repeated.

The transmitter portions of transceivers 1342, 1442, or 1542 of FIGS. 13-15 may operate similarly to one another so each will not be described separately. Referring once again to FIG. 13, a transmitter portion of the transceiver 1342 may convert information, which is to be transmitted by the wireless electronic device 1301, into electromagnetic signals suitable for radio communications. A receiver portion of the transceiver 1342 may demodulate electromagnetic signals, which are received by the wireless electronic device 1301. The transceiver 1342 may include transmit/receive circuitry (TX/RX) that provides separate communication paths for supplying/receiving RF signals to different radiating elements of the antenna system 1346 via their respective RF feeds. Accordingly, when the antenna system 1346 includes two active antenna elements, the transceiver 1342 may include two transmit/receive circuits 1343, 1345 connected to different ones of the antenna elements via the respective RF feeds. For example, the transmit/receive circuit 1343 may be connected to a Wi-Fi antenna, satellite antenna, MIMO antennas, a close/short-range (e.g., a Near-Field Communication (NFC), or BLUETOOTH®) antenna, whereas the transmit/receive circuit 1345 may be connected to a cellular antenna, satellite antenna, or a 3G, 4G, LTE, or 5G antenna. Moreover, the antenna system 1346/transceiver 1342 may include a GPS receiver.

Referring still to FIG. 13, the memory 1353 can store computer program instructions that, when executed by the processor circuit 1351, carry out operations of the wireless electronic device 1301. In some embodiments, the memory 1353 can be a non-transitory computer readable storage medium including computer readable program code therein that when executed by the processor 1351 causes the processor 1351 to perform a method described herein. As an example, the memory 1353 can store an application which can perform the operations illustrated in various blocks of the flow charts of FIGS. 3 to 12. The memory 1353 can be, for example, a non-volatile memory, such as a flash memory, that retains the stored data while power is removed from the memory 1353. The memories 1453 and 1553 of FIGS. 14 and 15 operate similarly to that of the memory of FIG. 13 and thus will not be discussed separately.

Figure 16:
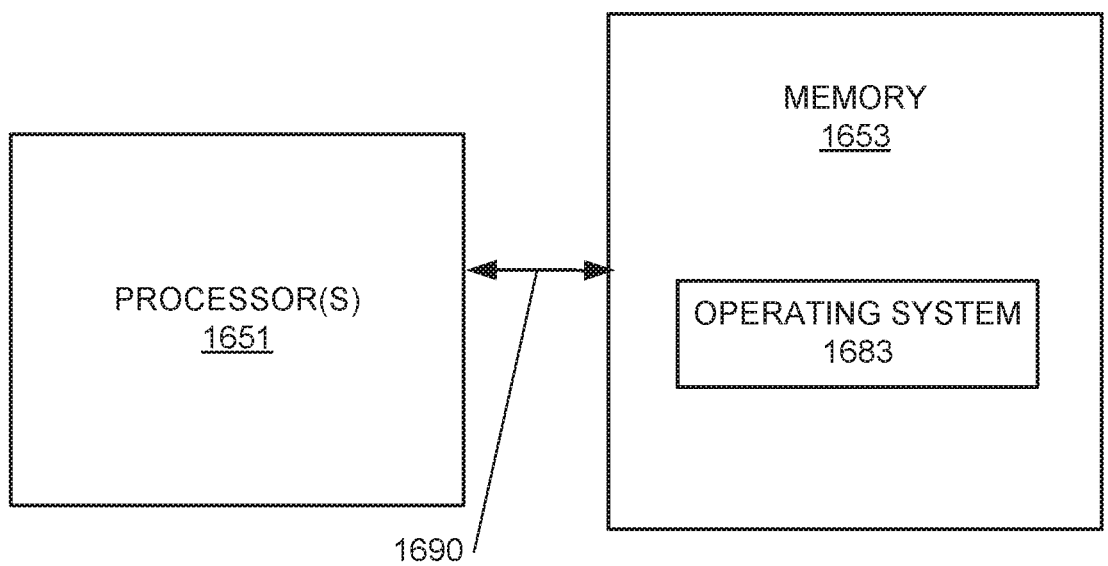
FIG. 16 is a block diagram of an example processor and memory that may be used in accordance with embodiments of the present inventive concepts.

FIG. 16 illustrates a block diagram of an example processor 1651 and memory 1653 that may be used in accordance with various embodiments of the present inventive concepts. The processor 1651 communicates with the memory 1653 via an address/data bus 1690. The processor 1651 may be, for example, a commercially available or custom microprocessor. Moreover, the processor 1651 may include multiple processors. The memory 1653 is representative of the overall hierarchy of memory devices containing the software and data used to implement various functions as described herein. The memory 1653 may include, but is not limited to, the following types of devices: cache, ROM, PROM, EPROM, EEPROM, flash, Static RAM (SRAM), and Dynamic RAM (DRAM).

Still referring to FIG. 16, the memory 1653 may hold various categories of software and data, such as an operating system 1683. The processor 1651 and memory 1653 may correspond to any of the processors 1351, 1451, and/or 1551 and memories 1353, 1453, and/or 1553 of any of wireless electronic device 1301, MSS wireless electronic device 1401, and/or BWA wireless electronic device 1501 of FIGS. 13-15. Accordingly, the operating system 1683 can control operations of the devices 1301, 1401, and/or 1501. In particular, the operating system 1683 may manage the resources of corresponding devices 1301, 1401, and/or 1501 and may coordinate execution of various programs performing operations described herein by the processor 1651.

Channel State information (CSI) may be used to configure MIMO and/or massive MIMO systems associated with BWA networks. The term "channel status" may be used to refer to channel characteristics between a terrestrial BWA base station and a UE in a BWA network or channel characteristics between a satellite and the terrestrial BWA base station. A terrestrial BWA base station may measure the channel status of signals received from a satellite in an MSS network. In some embodiments, a forward feedback loop may be used on a dynamic basis to reduce interference from a terrestrial BWA base station to a MSS satellite. A pilot signal may be sent from the MSS satellite and received by a terrestrial BWA base station. The terrestrial BWA base station may determine channel characteristics in the satellite downlink (i.e. MSS satellite to MSS UEs) and assume channel reciprocity indicating that the satellite uplink (i.e. MSS UEs to MSS satellite) experiences similar channel characteristics as the satellite downlink. Thus, the terrestrial BWA base station may null the power of transmissions in the direction of a MSS satellite, based on the pilot signal received from the MSS satellite.

Figure 17:
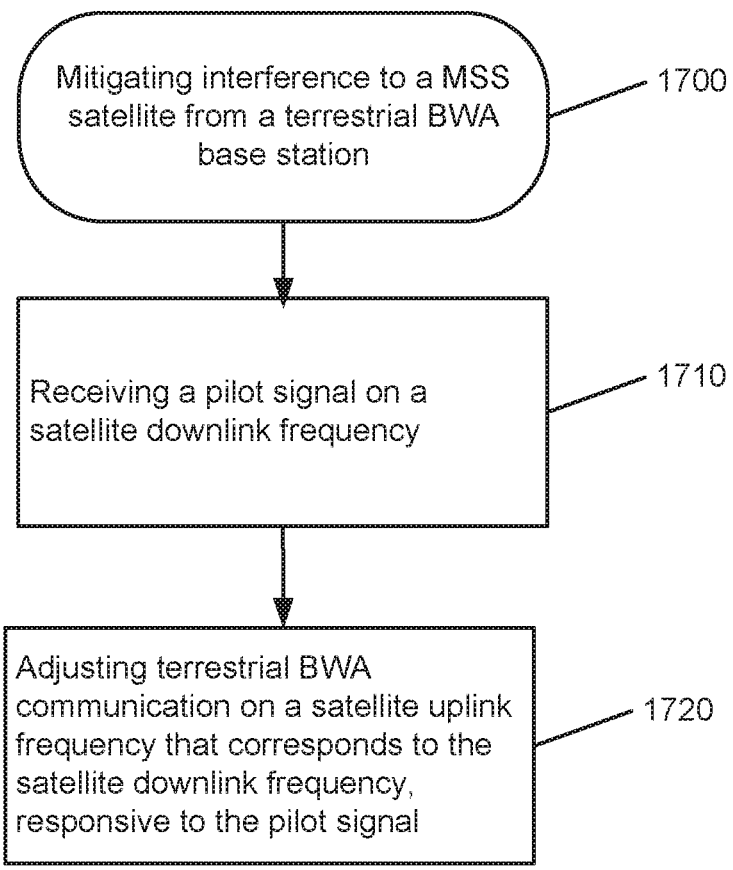
FIGS. 17 to 21 are flowcharts illustrating operations for reducing interference to a MSS satellite, according to some embodiments of the present inventive concepts.

FIGS. 17 to 21 are flowcharts illustrating operations for reducing interference to a MSS satellite. Referring now to FIG. 17, mitigating interference to a Mobile Satellite Service (MSS) satellite from a terrestrial Broadband Wireless Access (BWA) base station, at block 1700, may include receiving, at the terrestrial BWA base station, a pilot signal on a satellite downlink frequency, at block 1710. Terrestrial BWA communication on a satellite uplink frequency that corresponds to the satellite downlink frequency may be adjusted, responsive to the pilot signal, at block 1720.

Figure 18:
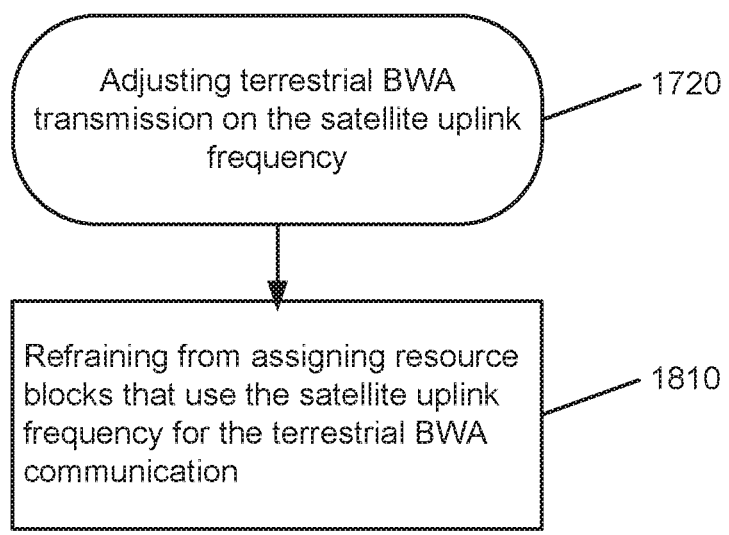
Figure 19:
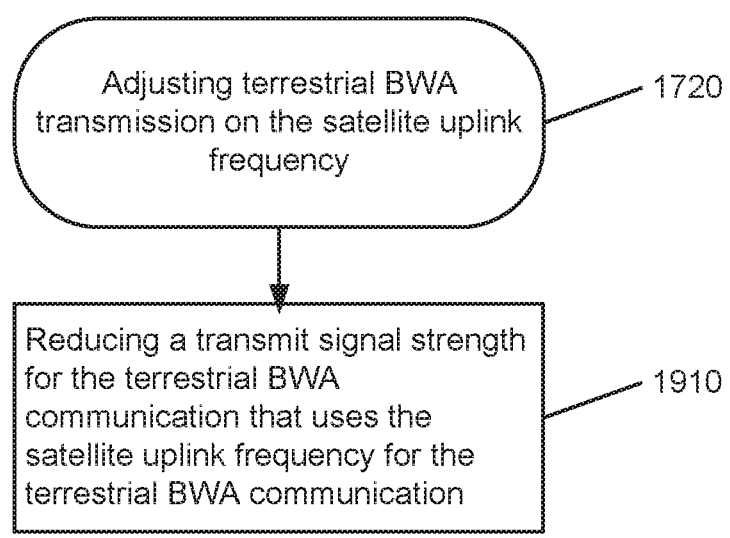

Referring now to FIG. 18, in some embodiments, adjusting terrestrial BWA transmission on the satellite uplink frequency, at block 1720, may include refraining from assigning resource blocks that use the satellite uplink frequency for the terrestrial BWA communication, at block 1810. Referring now to FIG. 19, in some embodiments, adjusting terrestrial BWA transmission on the satellite uplink frequency, at block 1720, may include reducing, by the terrestrial BWA base station, a transmit signal strength for the terrestrial BWA communication that uses the satellite uplink frequency for the terrestrial BWA communication, at block 1910.

Figure 20:
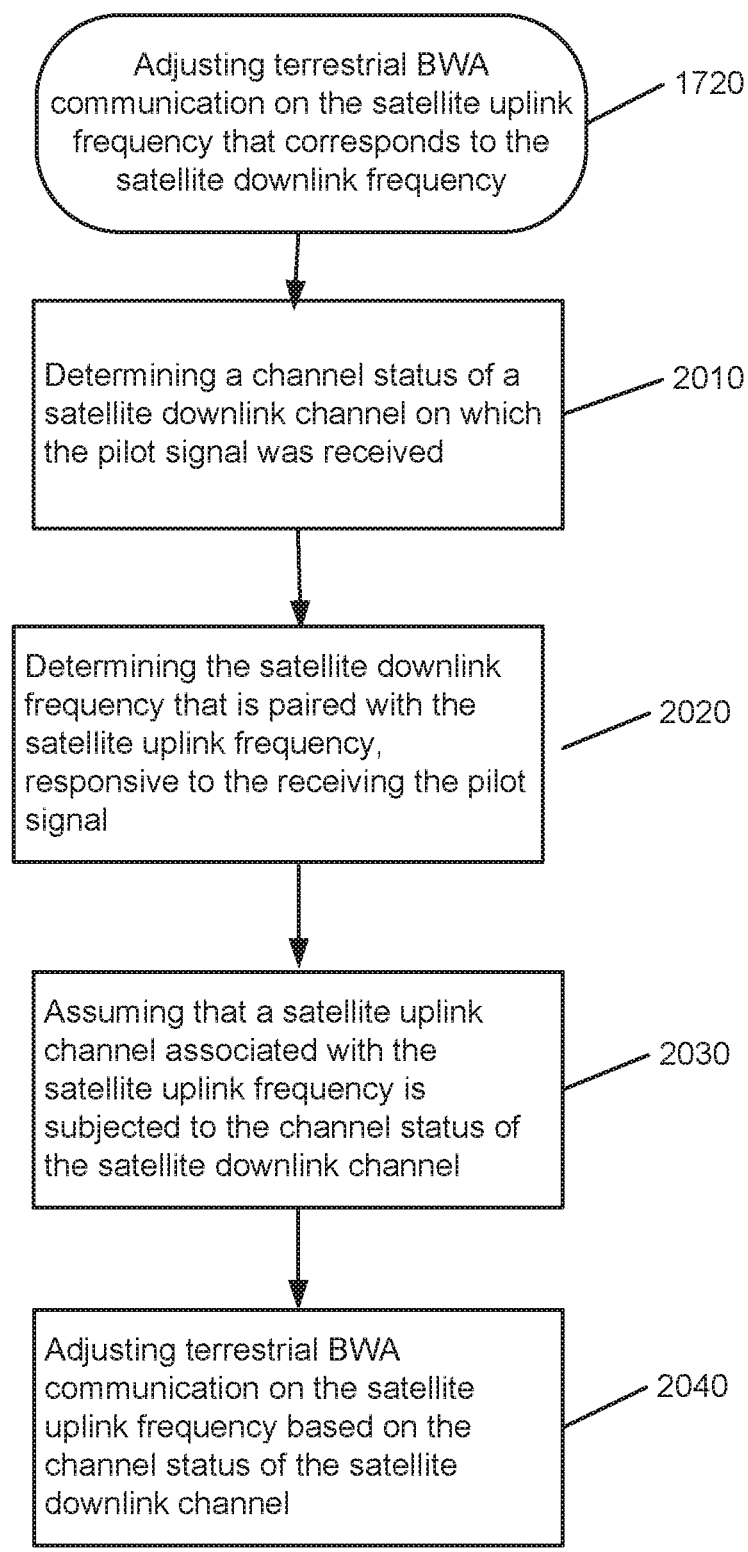

Referring now to FIG. 20, in some embodiments, adjusting terrestrial BWA transmission on the satellite uplink frequency, at block 1720, may include determining a channel status of a satellite downlink channel on which the pilot signal was received, at block 2010. The satellite downlink frequency that is paired with the satellite uplink frequency may be determined, responsive to the receiving the pilot signal, at block 2020. A satellite uplink channel associated with the satellite uplink frequency may be assumed to be subjected to the channel status of the satellite downlink channel, at block 2030. Terrestrial BWA communication on the satellite uplink frequency may be adjusted based on the channel status of the satellite downlink channel, at block 2040.

Figure 21:
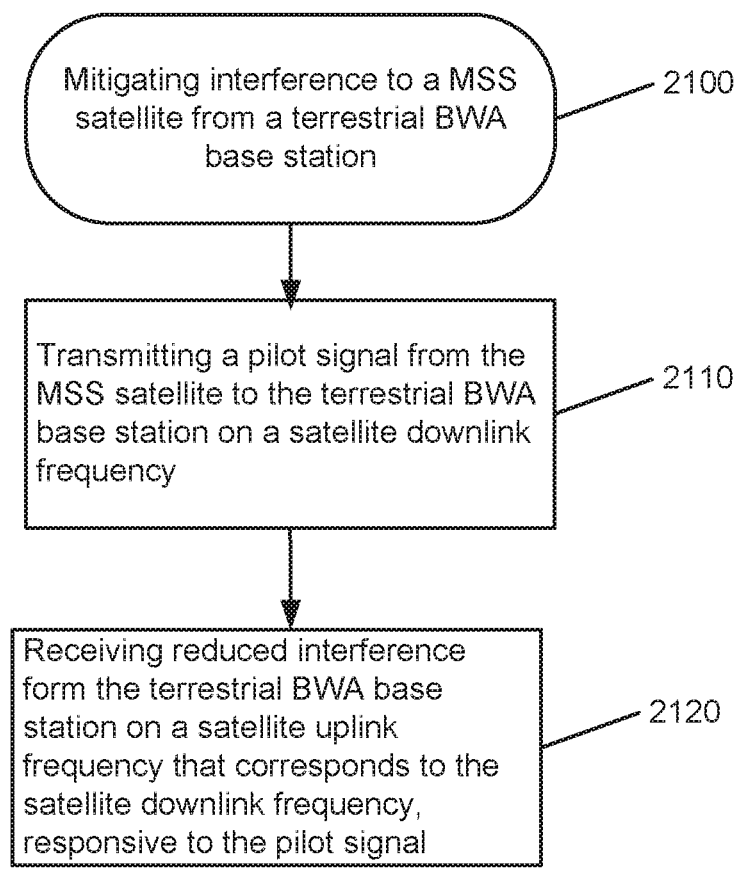

Referring now to FIG. 21, mitigating interference to a Mobile Satellite Service (MSS) satellite from a terrestrial Broadband Wireless Access (BWA) base station, at block 2100, may include transmitting a pilot signal from the MSS satellite to the terrestrial BWA base station on a satellite downlink frequency, at block 2110. Reduced interference on a satellite uplink frequency that corresponds to the satellite downlink frequency may be received from the terrestrial BWA base station, responsive to the pilot signal. The reduced interference from the terrestrial BWA base station may correspond to the terrestrial BWA base station refraining from assigning resource blocks that use the satellite uplink frequency. The reduced interference from the terrestrial BWA base station may correspond to reduced transmit signal strength of terrestrial BWA communication that uses the satellite uplink frequency for the terrestrial BWA communication. The pilot signal on the satellite downlink frequency may be subjected to a satellite downlink channel status that corresponds to a satellite uplink channel status.

A variety of different embodiments of the present inventive concepts have been disclosed herein, in connection with the above description and the drawings. It will be understood that it would be unduly repetitious and obfuscating to literally describe and illustrate every combination and sub-combination of these embodiments. Accordingly, the present specification, including the drawings, shall be construed to constitute a complete written description of all combinations and subcombinations of the embodiments of the present inventive concepts described herein, and of the manner and process of making and using them, and shall support claims to any such combination or subcombination.

It will be understood that when an element is referred to as being "connected," "coupled," or "responsive" to another element, it can be directly connected, coupled, or responsive to the other element or intervening elements may be present. Furthermore, "connected," "coupled," or "responsive" as used herein may include wirelessly connected, coupled, or responsive.

The terminology used herein is for the purpose of describing particular embodiments of the present inventive concepts only and is not intended to be limiting of the present inventive concepts. As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. The symbol "/" is also used as a shorthand notation for "and/or."

Unless otherwise defined, all terms (including technical and scientific terms) used herein have the same meaning as commonly understood by one of ordinary skill in the art to which the present inventive concepts belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms "first" and "second" may be used herein to describe various elements, these elements should not be limited by these terms. These terms are only used to distinguish one element from another element. Thus, a first element could be termed a second element, and similarly, a second element may be termed a first element without departing from the teachings of the present inventive concepts.

A variety of different embodiments of the present inventive concepts have been disclosed herein, in connection with the above description and the drawings. It will be understood that it would be unduly repetitious and obfuscating to literally describe and illustrate every combination and sub-combination of these embodiments. Accordingly, the present specification, including the drawings, shall be construed to constitute a complete written description of all combinations and subcombinations of the embodiments of the present inventive concepts described herein, and of the manner and process of making and using them, and shall support claims to any such combination or subcombination.

In the drawings and specification, there have been disclosed example embodiments of the present inventive concepts. Although specific terms are employed, they are used in a generic and descriptive sense only and not for purposes of limitation, the scope of the present inventive concepts being defined by the following claims.

What is claimed is:

1. A method of mitigating interference to a Mobile Satellite Service (MSS) satellite from terrestrial Broadband Wireless Access (BWA) base stations, the method comprising:

assigning a first terrestrial frequency to first transmissions in a first base station subsector associated with a first terrestrial BWA base station that is in a first geographical area, wherein the first terrestrial frequency is used as a first satellite uplink frequency;

nulling the first transmissions at the first terrestrial frequency in the first base station subsector associated with the first terrestrial BWA base station to mitigate interference to communication using the first satellite uplink frequency on a satellite uplink of the MSS from the first terrestrial BWA base station; and nulling second transmissions in a second base station subsector associated with a second terrestrial BWA base station that is in a second geographical area different from the first geographical area.

2. The method of claim 1, wherein the nulling first transmissions in the first base station subsector comprises:
refraining from assigning resource blocks that use the first terrestrial frequency in the first base station subsector to first BWA User Equipments (UEs) serviced by the first terrestrial BWA base station.

3. The method of claim 2, wherein the second transmissions in the second base station subsector are assigned to a second terrestrial frequency, wherein the second terrestrial frequency is used as a second satellite uplink frequency, and wherein the nulling second transmissions in the second base station subsector comprises:
refraining from assigning resource blocks that use the second terrestrial frequency in the second base station subsector to second BWA User Equipments (UEs) serviced by the second terrestrial BWA base station.

4. The method of claim 1, wherein the nulling first transmissions in the first base station subsector comprises:
reducing transmit power in the first base station subsector from the first terrestrial BWA base station to first BWA User Equipments (UEs) below a satellite interference threshold power.

5. The method of claim 4, wherein the first geographical area comprises a first plurality of terrestrial BWA base stations comprising the first terrestrial BWA base station, wherein the reducing transmit power in the first base station subsector comprises:
reducing an aggregated transmit power in the first base station subsector of the first plurality of terrestrial BWA base stations below a satellite interference threshold power.

6. The method of claim 1, wherein the first base station subsector comprises an intersection of a horizontal sector of a plurality of horizontal sectors and a vertical sector of a plurality of vertical sectors defined by an active antenna pattern associated with the first terrestrial BWA base station.

7. The method of claim 6, wherein the first base station subsector is selected based on respective down tilt angles of ones of the plurality of vertical sectors associated with the first terrestrial BWA base station and based on respective directions with respect to the MSS satellite of ones of the plurality of horizontal sectors associated with the first terrestrial BWA base station.

8. A method of mitigating interference to a Mobile Satellite Service (MSS) satellite from terrestrial Broadband Wireless Access (BWA) base stations, the method comprising:
nulling first transmissions in a first base station subsector associated with a first terrestrial BWA base station that is in a first geographical area;
nulling second transmissions in a second base station subsector associated with a second terrestrial BWA base station that is in a second geographical area different from the first geographical area;
monitoring a plurality of satellite frequencies at the MSS satellite for interference caused by one or more of the first and second terrestrial BWA base stations at the MSS satellite; and
identifying a satellite frequency of the plurality of satellite frequencies responsive to the interference caused by the one or more of the first and second terrestrial BWA base stations being below a threshold interference for use for MSS communication.

9. The method of claim 8, further comprising:
refraining from assigning resource blocks that use the satellite frequency that was identified to BWA User Equipments (UEs) for terrestrial communication.

10. The method of claim 8,
wherein the satellite frequency comprises a satellite uplink frequency of the MSS satellite,
wherein a first terrestrial frequency is used as the satellite uplink frequency, and
wherein nulling the first transmissions in the first base station subsector associated with the first terrestrial BWA base station comprises nulling the first transmissions at the first terrestrial frequency to mitigate the interference to the satellite uplink frequency of the MSS satellite from the BWA base stations.

11. The method of claim 1,
wherein the second transmissions in the second base station subsector are assigned to a second terrestrial frequency, and
wherein the second terrestrial frequency is used as a second satellite uplink frequency.

12. The method of claim 1,
wherein the nulling the first transmissions comprises a first nulling operation on a first cluster of BWA base stations comprising the first terrestrial BWA base station in the first geographical area,
wherein the nulling the second transmissions comprises a second nulling operation on a second cluster of BWA base stations comprising the second terrestrial BWA base station in the second geographical area, and
wherein the first nulling operation is different from the second nulling operation.

13. The method of claim 1, further comprising:
identifying usable radio spectrum for the MSS using carrier sense monitoring in conjunction with clustered nulling and reverse frequency assignment.

* * * * *